May 24, 1949.  O. R. PETERSON ET AL  2,471,346
BRAKE MOUNTING AND CONTROL
Filed Nov. 19, 1945  2 Sheets-Sheet 1

INVENTORS
OSCAR R. PETERSON
ROBERT A. PETERSON
BY
ATTORNEY

May 24, 1949.　　O. R. PETERSON ET AL　　2,471,346
BRAKE MOUNTING AND CONTROL
Filed Nov. 19, 1945　　2 Sheets-Sheet 2
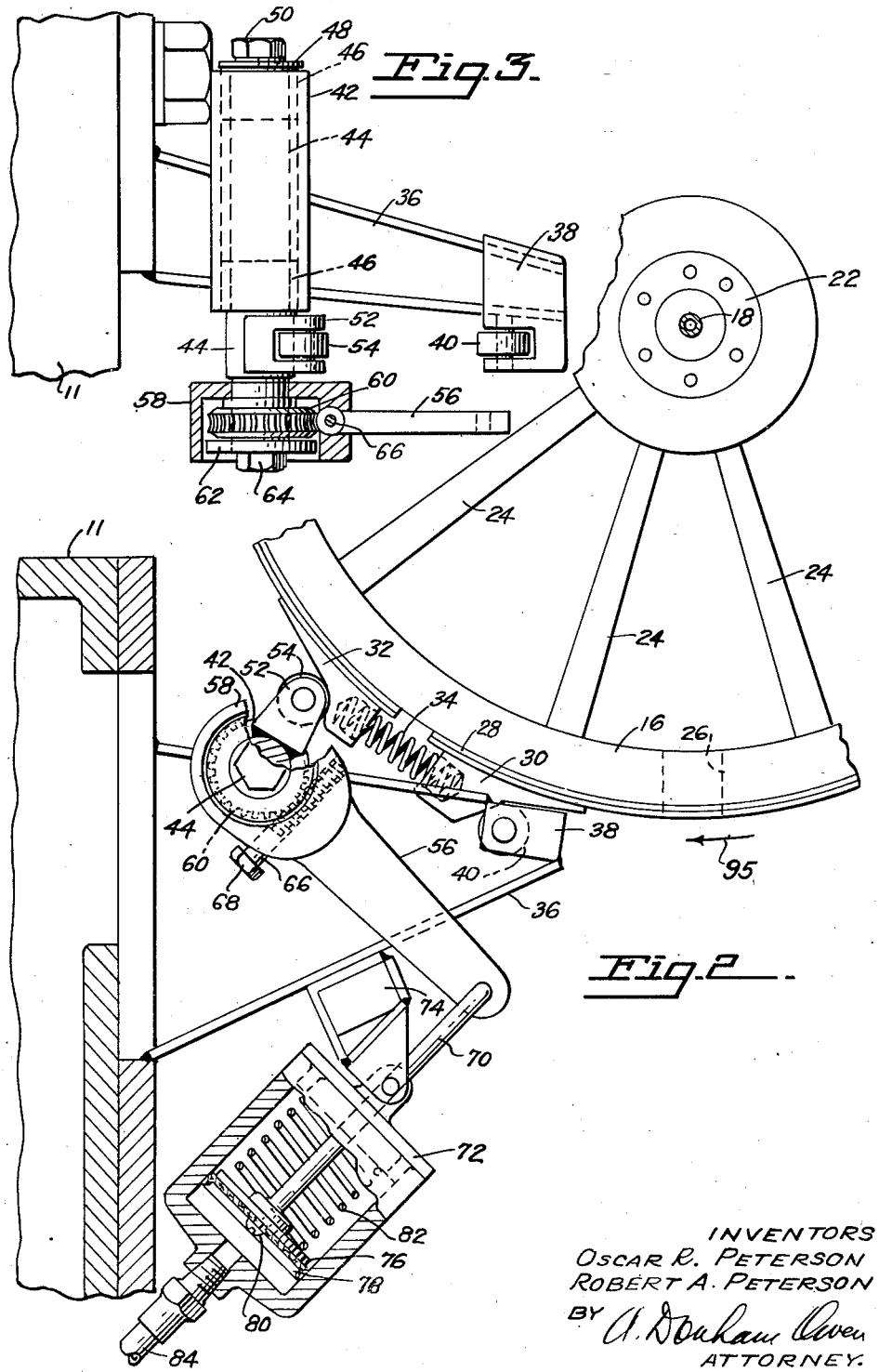
INVENTORS
OSCAR R. PETERSON
ROBERT A. PETERSON
BY
ATTORNEY.

Patented May 24, 1949

2,471,346

UNITED STATES PATENT OFFICE 2,471,346

BRAKE MOUNTING AND CONTROL

Oscar R. Peterson, Oakland, and Robert A. Peterson, San Leandro, Calif.

Application November 19, 1945, Serial No. 629,342

9 Claims. (Cl. 188—77)

1

Our invention relates to brake mechanisms and in particular to a brake adapted to control the movement of a winch drum or wheel and automatically responsive to resist rotation of the brake drum in one direction.

One object of our invention is to provide a brake mechanism which is simple and efficient in construction and in which a worn brake band may be replaced without disturbing the brake-actuating elements.

Another object of our invention is to facilitate the servicing of brake mechanism by so constructing a brake that worn parts may be replaced quickly and by unskilled personnel.

Still another object of our invention is to provide an inexpensive brake mechanism suitable for application to a power driven winch and automatically actuated to brake the winch drum as soon as the hoisting power is released.

An important feature of our invention resides in a brake band having lugs at each end engaged by a pair of stops which are the only means retaining the band on the drum and of which one may be retracted to permit the brake band to be axially displaced and removed from the drum.

Another feature of the invention consists in the provision of spring loaded means normally urging one end of the band against the drum with a gentle pressure whereby rotation of the drum in one direction causes the band automatically to wrap itself about the drum to check the rotation of the drum, and upon rotation in the opposite direction the pressure of the end of the band is sufficient to lift the balance of the band out of gripping contact with the drum. The spring loaded means is opposed by fluid operated mechanism which may be actuated to disengage the band from braking position to permit free rotation of the drum in either direction.

These and other objects and features of the invention will best be understood and appreciated from the following detailed description of a preferred embodiment thereof selected for purposes of illustration and shown in the accompanying drawings, in which:

Fig. 2 is a view in elevation of the brake-actuating mechanism; and

Fig. 3 is a plan view of the stop mechanism.

Figure 1:
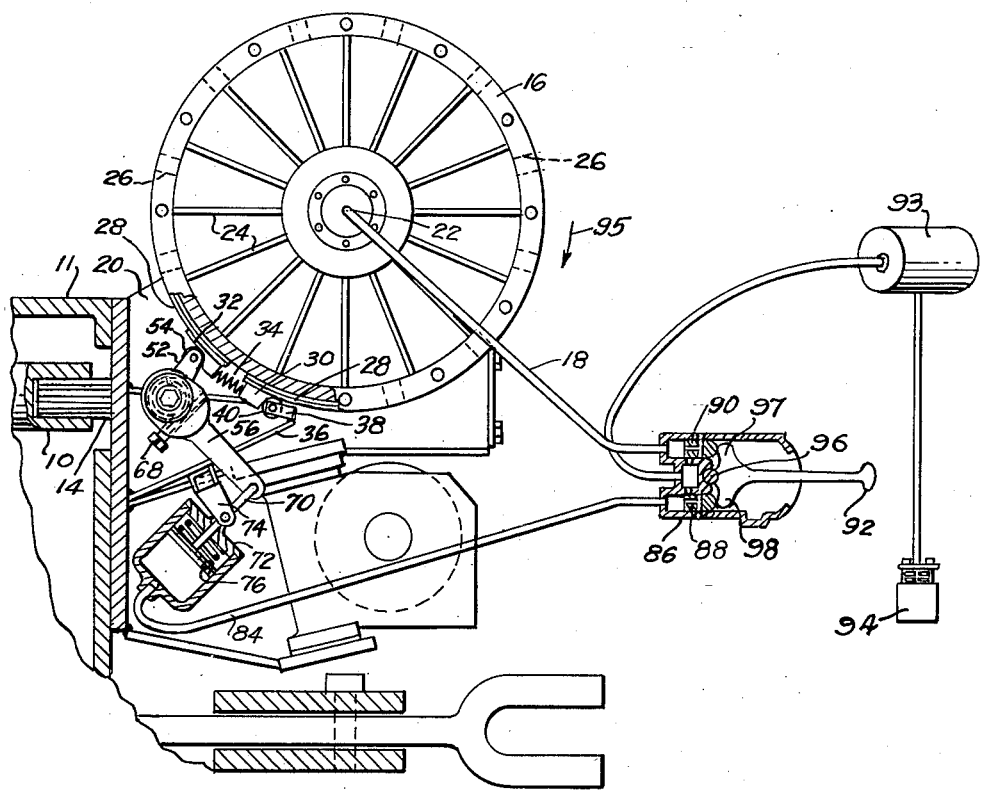
Fig. 1 is a view in elevation showing the brake mounting and associated elements.

The embodiment of our invention shown in the drawing illustrates the application of our novel brake mechanism to a winch mounted on a tractor or similar vehicle. Referring to Fig. 1, there is shown a power take-off shaft 10 driven from a

2 tractor engine and disposed within a housing 11 which forms part of the tractor body. A gear box 20 is secured to the tractor and carries reduction gearing driven from a shaft 14 splined to the shaft 10 and in turn driving a shaft (not shown) upon which a winch drum 16 is mounted for rotation. A clutch of the type described in our co-pending application Ser. No. 532,099, filed April 21, 1944 which resulted in Patent No. 2,442,510, issued June 1, 1948, and of which this is a continuation-in-part, is employed to couple the drum to the shaft when actuated by forcing fluid through a conduit 18 which leads to a clutch hub 22. The outer face of the winch drum 16 is provided with a series of stiffening vanes 24 and peripheral vents 26. Any other form of clutch may be used.

The periphery of the outer drum cheek is employed as a braking surface. A brake band 28 of conventional material is wrapped about the periphery of the drum 16, and to the ends of the band is secured a pair of lugs 30 and 32. Each lug has an inclined cam face on its inner end and a socket formed in its outer end. A helical compression spring 34 is received in the sockets of the lugs 30 and 32 and urges the ends of the band 28 apart, thus tending to expand the brake band so that it will not resist rotation of the winch drum 16. This spring 34 may be omitted if desired. From the housing 11 there extends a triangular bracket 36 in the apex of which there is welded a block 38 carrying a roller 40 so disposed as to bear upon the cam face of the lug 30.

Mounted in fixed position on the bracket 36 is a tubular member 42 within which is journalled a stub shaft 44 supported internally by a pair of bushings 46 and held against axial movement by a washer 48 and lock nut 50 disposed at one end thereof. Welded to the shaft 44 externally of the tube 42 is a yoke 52 carrying a freely mounted roller 54. A lever 56 terminates at one end in a housing 58 having a square aperture engaging a correspondingly squared portion of the shaft 44 and encompassing a worm wheel 60 keyed on the shaft 44. A large washer 62 is held in place on the end of the shaft 44 and seals the housing 58; a lock nut 64 retains the washer. A worm 66 having a hexagonal head 68 is journalled in the housing 58 and meshes with the worm wheel 60. Rotation of the worm 66 causes the worm wheel 60 to rock the shaft 44 and thus swing the yoke 52 with its roller 54. The roller 54 bears against the cam face on the lug 32. When the brake is assembled, the roller 54 is adjusted to cramp the lug 32 towards the lug 30 against the action of the spring 34. When it becomes necessary to replace a worn brake band, the worm 66 is turned to retract the roller 54 from engagement with the cam face on the lug 32, thus permitting the brake band to be first moved circumferentially until the lug 30 disengages from the stop 40 and then axially until the band is completely separated from the drum 16. Thus the operation of substituting a new brake band is simple and can be performed by unskilled persons. No removal of bearings, wheels, or even bolts is required. Lugs 30 and 32 are preferably made identical so that no care need be exercised, in assembling, as to which end is which. It is an easy matter to slip a new band in position and take up on the worm 66 until the roller 54 bears with a gentle force on the lug 32. It should also be explained at this point that the rollers 40 and 54 are stops which not only limit the movement of the brake band 28 but also are the instrumentalities through which braking and releasing forces are brought to bear. It is obvious that the worm 66 serves as an adjustment by means of which the mechanism may be tightened as the brake band 28 wears thinner.

The outer end of the lever 56 is apertured to receive the hooked end of a rod 70 which passes into a dash pot 72 pivotally mounted on the bracket 36 by an auxiliary bracket 74. Within the dash pot, the inner end of the rod 70 is secured to a piston 76, and a leather washer 78 is secured to the face of the piston by a screw 80. A helical compression spring 82 encompasses the rod 70 and bears against the end of the dash pot 72 and the piston 76. The spring 82 serves to rock the lever 56 so that the stop 54 is pressed firmly against the cam face on the lug 32.

Passing into the lower end of the dash pot 72 is a conduit 84 through which air or liquid, or any suitable fluid may be forced to bring pressure against the piston 76. As shown in Fig. 1, the conduit 84 terminates in a housing 86 in which is located a pair of valves 88 and 90 controlled by a three-position hand lever 92. The valve 88 controls the conduit 84, while the valve 90 controls a conduit 18 which runs to a fluid-operated clutch of the type referred to in our co-pending application Ser. No. 532,099 and not shown herein.

A fluid medium is stored under pressure in a tank 93 by means of a compressor 94. From this tank 93 the fluid under pressure is admitted by the control lever 92, either through the valve 88 to the brake conduit 84, or through the valve 90 into the clutch conduit 18.

Any form of control and valve arrangement may be used, and the one described is a suitable form. The control lever 92 has three positions and is pivoted at 96. It has the arms 97 and 98. In the position shown in Fig. 1, the clutch is de-energized and the brake is applied by means described herein. To energize the clutch the arm 97 is moved to the left by lifting the handle 92, which engages a suitable valve stem, and opens the valve 90, admitting fluid pressure to engage the clutch. In this position, the brake release valve 88 is still vented to the atmosphere, through the bleed port. When the lever 92 is moved down to its third position, the arm 97 leaves the valve 90 with the fluid pressure cut off to the clutch and the conduit 18 vented to the atmosphere. The arm 98 moves the valve 88 which sends fluid under pressure to the dash pot 72 to release the brake band. Whenever the clutch is disengaged the brake is automatically engaged. The brake is released by moving the valve handle 92 down.

Normally the spring 82 causes the stop 54 to press the lug 32 in such fashion as to keep the adjacent end of the brake band in gentle contact with the brake drum. When power is supplied through the clutch, the drum rotates in a clockwise direction as shown by the arrow 95. During such rotation the gentle friction of the last mentioned end portion of the brake band against the drum is not sufficient to impair the efficiency of the winch but it is sufficient to cause the remaining portions of the brake band to be lifted away from braking contact with the brake drum. When the control handle 92 is thrown to central position, the clutch is disengaged and the load on the cable wound around the winch drum 16 would rotate the drum in a counterclockwise direction, except that at this instant the above mentioned gentle friction of the end of the brake band on the drum causes the band 28 to wrap or energize itself tightly into engagement with the brake surface of the drum, and any rotation is prevented. When the handle 92 is thrown to low position, fluid enters the dash pot 72 through the tube 84 and forces the piston 76 to move against the action of the spring 82. Consequently the rod 70 is moved outwardly of the dash pot, and the lever 56 is rocked to lift any brake-applying pressure of the stop roller 54 from the lug 32, permitting the ends of the brake band to separate and free the band sufficiently to allow rotation of the drum in a counterclockwise or clockwise direction. By throwing the handle 92 back to center position, the spring 82 reapplies pressure to the brake band at 32 which in turn causes the band to wrap itself tightly against the drum so long as the drum has a rotative force being applied to it in a counterclockwise direction.

It should be pointed out that the brake mechanism of our invention is not only self-releasing in one direction but is self-energizing in the other direction. Another advantageous features of our brake mechanism is that, when desired, the drum may run free to drop the load held by the cable wound on the winch drum 16. The operator, by rocking the control handle 92 up and down can obtain practically instantaneous change from any one of three conditions—to lift the load, to hold the load, or to release the load. Also this brake has the desirable characteristic that in changing from any of the above conditions to another, there is no slippage or unwanted rotation of the drum.

Furthermore the instrumentalities which hold the brake band in place are the same ones through which power is applied to the brake. Consequently, since these stops are arranged to bear only tangentially upon the brake band lugs, the problem of removing a worn band is reduced to the simplest possible terms.

From the foregoing description of one preferred embodiment of our invention its many advantages become apparent. Not only does it achieve great economy in manufacture because of requiring fewer parts to be made, but it also effects great economy in assembly cost both in the original factory assembly and in field assembly for repair parts. Its value next becomes apparent where the remote control, with lightning-like rapidity, from lifting to holding to dropping or vice versa achieves a better result than in any device heretofore known. An important feature of our invention is that this control is remote and is achieved without any complicated operating rods or mechanisms. This means that the control lever can be placed convenient to the driver.

It is to be understood that we have illustrated here but one of a host of possible embodiments of the spirit of our invention and we understand that there will be many changes which will suggest themselves to those skilled in the art. However, our invention is to be measured for scope not by the specific details herein shown, but rather by reference to the appended claims.

We claim:

1. A brake comprising a drum, a housing disposed adjacent said drum, a brake band disposed about said drum, lugs secured to each end of said band, a fixed stop secured to said housing and engaging one of said lugs, a movable stop engaging the other lug, means securing said movable stop for pivotal movement toward and away from the associated lug, spring-loaded means normally bearing on said movable stop to urge the adjacent end of the brake band against the drum, and means for moving said movable stop out of engagement with the associated lug to permit said brake band to be displaced axially from said drum.

2. In an instantaneous braking system having a brake drum mounted on a shaft which is rotated intermittently in either direction, the combination of a split brake band wrapped around the outside of said drum, and supported against radial movement solely by said drum, and having a sloping cam-faced lug at each end; a pair of roller stops, one engaging the sloping face of each lug and comprising the sole means for holding said brake band against rotative movement around said drum; means for moving one of said stops over the cam face of its associated lug, said means including a resilient compression means to apply a gentle pressure on said lug and the adjacent end of said brake band.

3. In a braking system having a rotatable brake drum, the combination of a brake band wrapped around the outside of said drum, and having a sloping cam-faced lug at each end; a pair of roller stops, one engaging the sloping face of each lug and comprising the sole means for holding said brake band against rotative movement around said drum; and means for moving one of said stops over the cam face of its associated lug, said means including a resilient compression means to apply a gentle pressure on said lug and the adjacent end of said brake band.

4. In a braking system having a rotatable brake drum, the combination of a brake band wrapped around the outside of said drum, and supported against radial movement solely by said drum, and having a sloping cam-faced lug at each end; a pair of roller stops, one engaging the sloping face of each lug and comprising the sole means for holding said brake band against rotative movement around said drum; and means for moving one of said stops over the cam face of its associated lug, said means including a resilient compression means to apply a gentle pressure on said lug and the adjacent end of said brake band.

5. In a braking system having a rotatable brake drum, the combination of a brake band wrapped around the outside of said drum, and having a sloping cam-faced lug at each end; a pair of roller stops, one engaging the sloping face of each lug and comprising the sole means for holding said brake band against rotative movement around said drum; and means for moving one of said stops over the cam face of its associated lug.

6. In a braking system having a brake drum mounted on a shaft which is rotated intermittently in either direction, the combination of a split brake band wrapped around the outside of said drum, and supported against radial movement solely by said drum, and having a sloping cam-faced lug at each end; a pair of roller stops, one engaging the sloping face of each lug and comprising the sole means for holding said brake band against rotative movement around said drum; and means for moving one of said stops over the cam face of its associated lug.

7. In an instantaneous braking system having a brake drum mounted on a shaft which is rotated intermittently in either direction, the combination of a split brake band wrapped around the outside of said drum, and supported against radial movement solely by said drum, and having a sloping cam-faced lug at each end; a pair of roller stops, one engaging the sloping face of each lug and comprising the sole means for holding said brake band against rotative movement around said drum; at least one of said stops being pivotally mounted so that it can be disengaged from said lug, and means for moving one of said stops over the cam face of its associated lug, said means including a resilient compression means to apply a gentle pressure on said lug and the adjacent end of said brake band.

8. In an instantaneous braking system having a brake drum mounted on a shaft which is rotated intermittently in either direction, the combination of a split brake band wrapped around the outside of said drum, and supported against radial movement solely by said drum, and having a sloping cam-faced lug at each end; a pair of roller stops, one engaging the sloping face of each lug and comprising the sole means for holding said brake band against rotative movement around said drum; at least one of said stops being mounted swingably on a pivot so that it can be disengaged from said lug and means for moving one of said stops over the cam face of its associated lug.

9. In an instantaneous braking system having a brake drum mounted on a shaft which is rotated intermittently in either direction, the combination of a split brake band wrapped around the outside of said drum, and supported against radial movement solely by said drum, and having a sloping cam-faced lug at each end; a pair of roller stops, one engaging the sloping face of each lug and comprising the sole means for holding said brake band against rotative movement around said drum; and a fluid operated lever system adapted to move one of said stops over the cam face of its associated lug, said lever system including a spring which applies a gentle pressure on said lug and the adjacent end of said brake band.

OSCAR R. PETERSON.
ROBERT A. PETERSON.

REFERENCES CITED

The following references are of record in the file of this patent:

UNITED STATES PATENTS

| Number | Name | Date |
|---|---|---|
| 1,607,161 | Judd | Nov. 16, 1926 |
| 1,692,027 | De Long | Nov. 20, 1928 |
| 2,308,299 | Page | Jan. 12, 1943 |
| 2,312,552 | Hutchins | Mar. 2, 1943 |
| 2,442,510 | Peterson et al. | June 1, 1948 |